US005304264A

United States Patent [19]

Wehrmann

[11] Patent Number: 5,304,264

[45] Date of Patent: Apr. 19, 1994

[54] ITEM APPLICATOR AND METHOD

[75] Inventor: Rick S. Wehrmann, Hudson, Ohio

[73] Assignee: Automated Packaging Systems, Inc., Twinsburg, Ohio

[21] Appl. No.: 787,836

[22] Filed: Nov. 5, 1991

[51] Int. Cl.$^5$ .............................................. B32B 31/00

[52] U.S. Cl. ...................................... 156/64; 156/361; 156/362; 156/542; 221/73

[58] Field of Search ............... 156/361, 362, 363, 540, 156/541, 542, 64; 221/73

[56] References Cited

U.S. PATENT DOCUMENTS

| | | | |
|---|---|---|---|
| Re. 30,149 | 10/1980 | Crankshaw et al. . | |
| 3,436,294 | 5/1964 | Marano . | |
| 3,661,625 | 5/1972 | La Mers . | |
| 3,729,362 | 4/1973 | French et al. | 156/363 |
| 3,860,473 | 1/1975 | Wesen . | |
| 3,944,455 | 3/1976 | French . | |
| 4,046,613 | 9/1977 | Kucheck et al. . | |
| 4,089,725 | 5/1978 | Crankshaw et al. . | |
| 4,132,583 | 1/1979 | Hodgson | 156/361 |
| 4,194,941 | 3/1980 | Briggs et al. . | |
| 4,210,484 | 7/1980 | Crankshaw et al. . | |
| 4,253,902 | 3/1981 | Yada . | |
| 4,255,220 | 3/1981 | Kucheck et al. . | |
| 4,267,004 | 5/1981 | Anderson . | |
| 4,270,968 | 6/1981 | Dudzik et al. . | |
| 4,288,272 | 9/1981 | Pfeffer . | |
| 4,317,694 | 3/1982 | Fuchs et al. . | |
| 4,328,063 | 5/1982 | Ingalls . | |
| 4,390,386 | 6/1983 | Bartl . | |
| 4,475,978 | 10/1984 | Bartl . | |
| 4,479,839 | 10/1984 | Tasma . | |
| 4,547,250 | 10/1985 | Murayama . | |
| 4,561,921 | 12/1985 | Treiber . | |
| 4,612,078 | 9/1986 | Karp . | |
| 4,612,079 | 9/1986 | Ostrow . | |
| 4,624,734 | 11/1986 | Voltmer et al. . | |
| 4,726,865 | 2/1988 | Treat . | |
| 4,758,303 | 7/1988 | Shastko . | |
| 4,822,442 | 4/1989 | Ashcraft et al. | 156/542 |
| 4,832,537 | 5/1989 | Roberts et al. . | |
| 4,832,776 | 5/1989 | Pace . | |
| 4,840,694 | 6/1989 | Brookman et al. . | |
| 4,842,660 | 6/1989 | Voltmer et al. . | |
| 4,846,912 | 7/1989 | Noel . | |
| 4,867,833 | 9/1989 | McCoy . | |
| 4,869,775 | 9/1989 | Quittner . | |
| 4,902,375 | 2/1990 | Holmes et al. . | |

FOREIGN PATENT DOCUMENTS

| | | |
|---|---|---|
| 0283750 | 9/1988 | European Pat. Off. . |
| 2555910 | 6/1977 | Fed. Rep. of Germany . |
| 3233546 | 3/1984 | Fed. Rep. of Germany . |
| 3911050 | 4/1990 | Fed. Rep. of Germany . |

OTHER PUBLICATIONS

European Search Report dated Feb. 2, 1993 for European Appln. No. EP 92 31 0153 citing German Patent Nos. DE 39 11 050 A1, DE 25 55 910A1, DE 32 33 546 A1 and European Application No. EPO 0 283 750 A2.

*Primary Examiner*—David A. Simmons

*Assistant Examiner*—William J. Matney, Jr.

*Attorney, Agent, or Firm*—Watts, Hoffmann, Fisher & Heinke Co.

[57] ABSTRACT

An item applicator machine having an item support which reciprocates in reference to an applicator arm. The item support is reciprocated within an item supply strip loop. The supply strip is advanced as the item support moves under the applicator arm. The supply strip is locked as the item support moves away from the applicator arm causing an item support dispensing edge to peel an item from the supply strip. A vacuum head on the applicator arm engages the item just prior to the item support's movement away from the applicator arm and picks up the dispensed item and applies it to an object. Curved faces are provided on alternative vacuum heads which are easily interchangeable with the flat faced vacuum head.

35 Claims, 6 Drawing Sheets

ITEM APPLICATOR AND METHOD

TECHNICAL FIELD

This invention relates to item applicating machines, and more specifically to applicating machines and a method of applying labels and hangers to packages and the like.

BACKGROUND

Hangers, labels and tags are items that are used to complete many packages and to provide product information. These items are often adhesively applied. If the items are not placed correctly, the finished appearance is not as attractive as it could be.

As an example of the need to apply such items accurately, in order to encourage "impulse buying," a package must hang and look right. If adhesively applied hangers are not repetitively applied to packages with precise location, display of a set of such packages will be uneven and unattractive.

With many applicator systems, the items to be applied are mounted on a flexible supply strip. These items are removed from the supply strip in order to apply them to a desired package or product. Removing and applying the items by hand is one method but is time consuming and inefficient.

The prior art teaches applicating machines which work in a variety of ways. Many use vacuums to grasp and hold an item to be applied to a package or product. Some of these use rotary drums which have a vacuum source connected to the drum. The drum rotates to grasp an item peeled from a supply strip by moving the strip around a dispensing edge. The drum rotates further to apply the item to the package. Others have the item peeled from a supply strip by moving the strip around a dispensing edge and then grasping it by a vacuum head which then applies it to a package. Some of these machines have the item partially floating on a flow of air prior to the vacuum head grasping the item.

The applicating machines of the prior art do not place the items correctly on the packages or products as consistently as they should. With the machines wherein the item actually floats before it is grasped by the vacuum head, the vacuum head often mislocates the item and sometimes even misses the item entirely and thereby a package fails to receive an item altogether.

Many of the prior machines are limited in the shape of packages or products to which they can apply items. The package's shape must be conducive to the shape of a machine's applicating face. For example, the face should preferably be concave in order to apply an item to a round object such as an apple or an orange. Yet a concave face is hardly conducive to applying an item to a flat box.

It would therefore be desirable to have an applicating machine which consistently applies items to packages or products in an accurate and attractive manner and which is capable of applying items to packages or products of a variety shapes.

SUMMARY OF THE INVENTION

An applicator machine made in accordance with the present invention applies items such as hangers, labels and tags at a labeling station to products at high production rates yet is accurate, consistent and efficient.

In its preferred embodiment, the machine has an item support which reciprocates in reference to an applicator head. The item support has a dispensing end portion and an opposed trailing end portion with opposed supply and exit surfaces extending from the dispensing end portion in a direction away from the labeling station. A flexible supply strip carrying items to be applied is supported by the item support and wrapped around its two end portions with a reach of the strip extending along the support between the end portions.

The applicator head is an articulated vacuum head and is located near the dispensing end of the item support for grasping items prior to and as they are peeled from the supply strip and then applying them to a package or product. The path of the vacuum head defines at least three positions including a retracted position, a pick-up position and an application position.

The supply strip is carried by supply and take-up devices with means for arresting movement between them. In the preferred embodiment, the supply strip is carried in coils on rotatable supply and take-up reels, which are mounted on spindles capable of locking. The strip forms a loop as it is running between the reels with the item support located within this loop. The support is connected to an air cylinder which reciprocates it between dispensing and retracted positions thereby moving it repeatedly between two portions of the supply strip which form the loop. The reels rotate as the item support moves from its retracted position toward the path of the vacuum head to its dispensing position. This motion advances the supply strip.

The vacuum head is moved from its retracted position to its pick-up position thereby meeting the item support and contacting an item. The vacuum head is held momentarily in its pick-up position. The reel spindles are then locked and the item support moves along a return path away from the path of the vacuum head to return to the retracted position. The trailing end portion moves against the supply strip causing the strip to move around the item support and peel the contacted item from the supply strip at the dispensing end portion. The dispensed item is then applied to a package or product by the vacuum head by moving the vacuum head to its application position. The vacuum head is then moved to its retracted position.

Because the vacuum head engages the item before it is peeled from the strip, the item is positioned on the vacuum head as precisely as it was on the supply strip thereby helping assure proper placement of the item on the package or product.

Another advantage is that an item of very light and flexible material may be used thereby helping assure that the item fits the contour of the package or product to which it is applied. Because these items many times are merely used to convey information to a consumer, these items need only be able to hold print. By using thinner, even poorer quality material for the items, cost savings can be realized. With a high volume of item usage, even a minute material cost savings per item results in a large overall cost savings by using the applicator machine embodying this invention.

By engaging such a flexible item prior to peeling, the vacuum head supports the item as it is peeled from the strip thereby preventing the item from floating in air after peeling. This helps assure alignment of the item on the vacuum head and thereby proper placement of the item on the package or product.

Additionally, an adhesive tailored to the requirements of the package or product may be used with the item. Because the vacuum head engages the item before it is peeled from the strip, a strong adhesive will not greatly hinder the peeling of the item from the supply strip. Thus, items can be placed on packages or products with better and stronger adhesives than can be used with prior applications, thereby helping assure that the items will remain on the packages or products.

A feature of the vacuum head is its pick-up surface. It typically is flat for applying items to flat packages and products. The vacuum head can be quickly and easily changed, however, to provide either a convexly or a concavely curved pick-up surface. Such curved pick-up surfaces allow the vacuum head to be used to apply items to curved packages and products such as fruit and saucers.

DESCRIPTION OF THE PREFERRED EMBODIMENT

Figure 1:
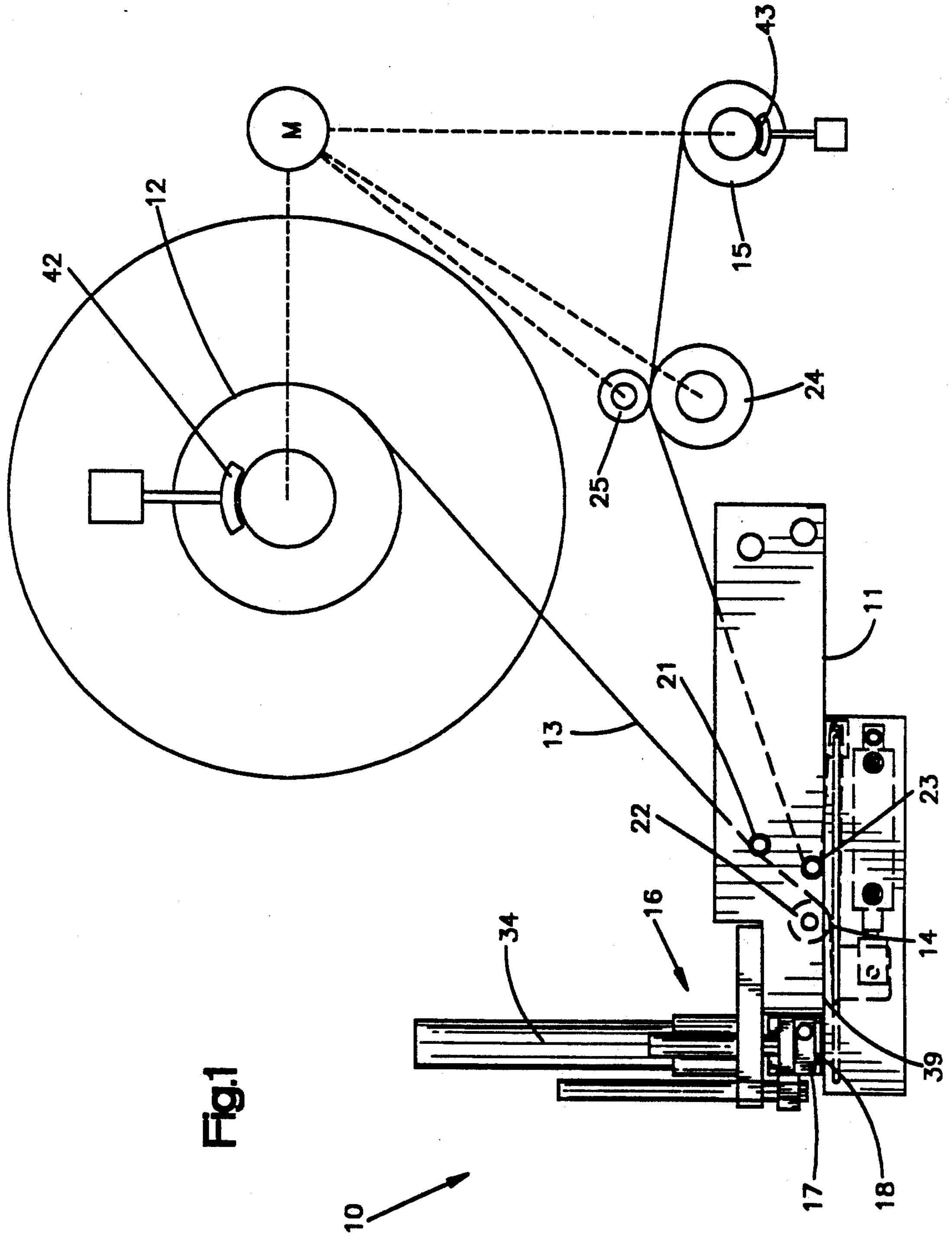
FIG. 1 is an elevational view of an applicator embodying the invention.

Turning to the drawings, a hanger applicator machine 10 is illustrated. The machine comprises a housing and frame structure 11 having a supply reel 12 which supplies a supply strip 13 of items to be applied. The supply strip 13 is wrapped around a reciprocatable item support table 14 which is connected to the housing and frame structure 11. The supply strip 13 is connected to a take-up reel 15 which coils the supply strip after the items have been removed from the strip 13. An applicator arm 16 having a vacuum head 17 with a perforate face 18 takes items dispensed from the supply strip 13 and applies them to a package or product. The face 18 communicates with a vacuum passage 19 which is connected to a vacuum source (shown schematically).

In the preferred embodiment, the item supply strip 13 containing items to be applied is engaged at one of its ends to the supply reel 13 and at another end to the take-up reel 15. The supply strip 13 can also be supplied from and taken up in boxes. The strip 13 passes through the structure 11 and is looped around the item support table 14, passing along a bottom surface of the item support table 14. The item support table 14 thereby delineates a section of a path of travel of the strip 13. A first idler 21 cooperates with a second idler 22 to properly position the strip before it reaches the item support 14. A third idler 23 properly positions the strip 13 after it has passed around the item support 14. The strip 13 passes between two pinch rollers 24, 25 prior to being taken up by the take-up reel 15. The pinch rollers 24, 25 help guide the supply strip 13 and index the items on the supply strip 13.

Figures 2, 2A:
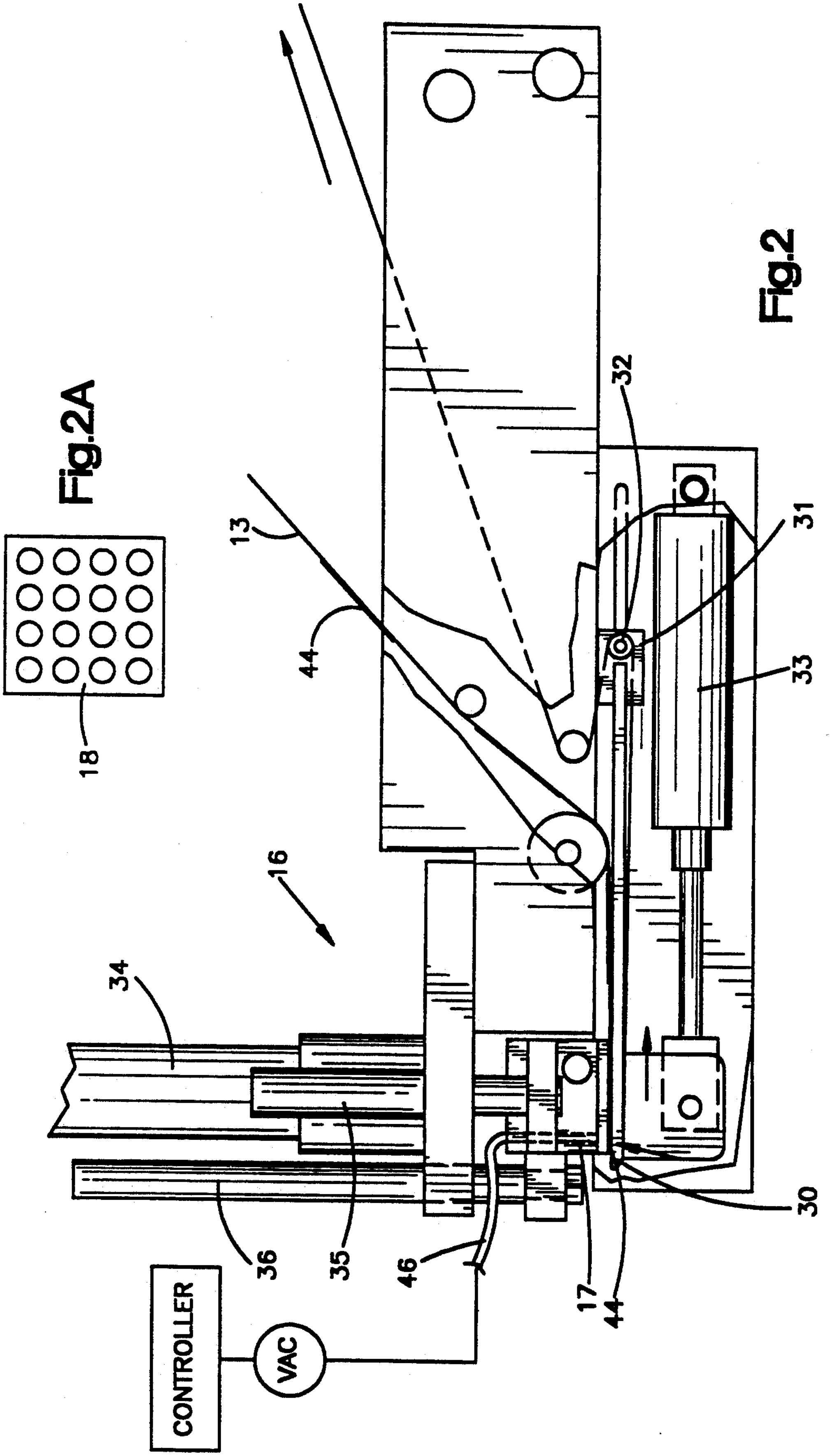
FIG. 2 is an enlarged fragmentary side elevational view having a part of the applicator machine broken away illustrating the item support beginning to return to its retracted position.
FIG. 2A is an enlarged plan view of the face of the vacuum head.

The item support 14 has a dispensing end portion or support beak 30 and an opposed trailing end portion 31. The trailing end portion 31 has an idler 32 which helps the supply strip 13 move around the item support 14. The item support 14 has an actuator 33, preferably in the form of an air cylinder. The actuator 33 moves the item support 14 between a retracted position, as seen in FIGS. 1 and 5, and a dispensing position, as best seen in FIG. 2.

Figure 3:
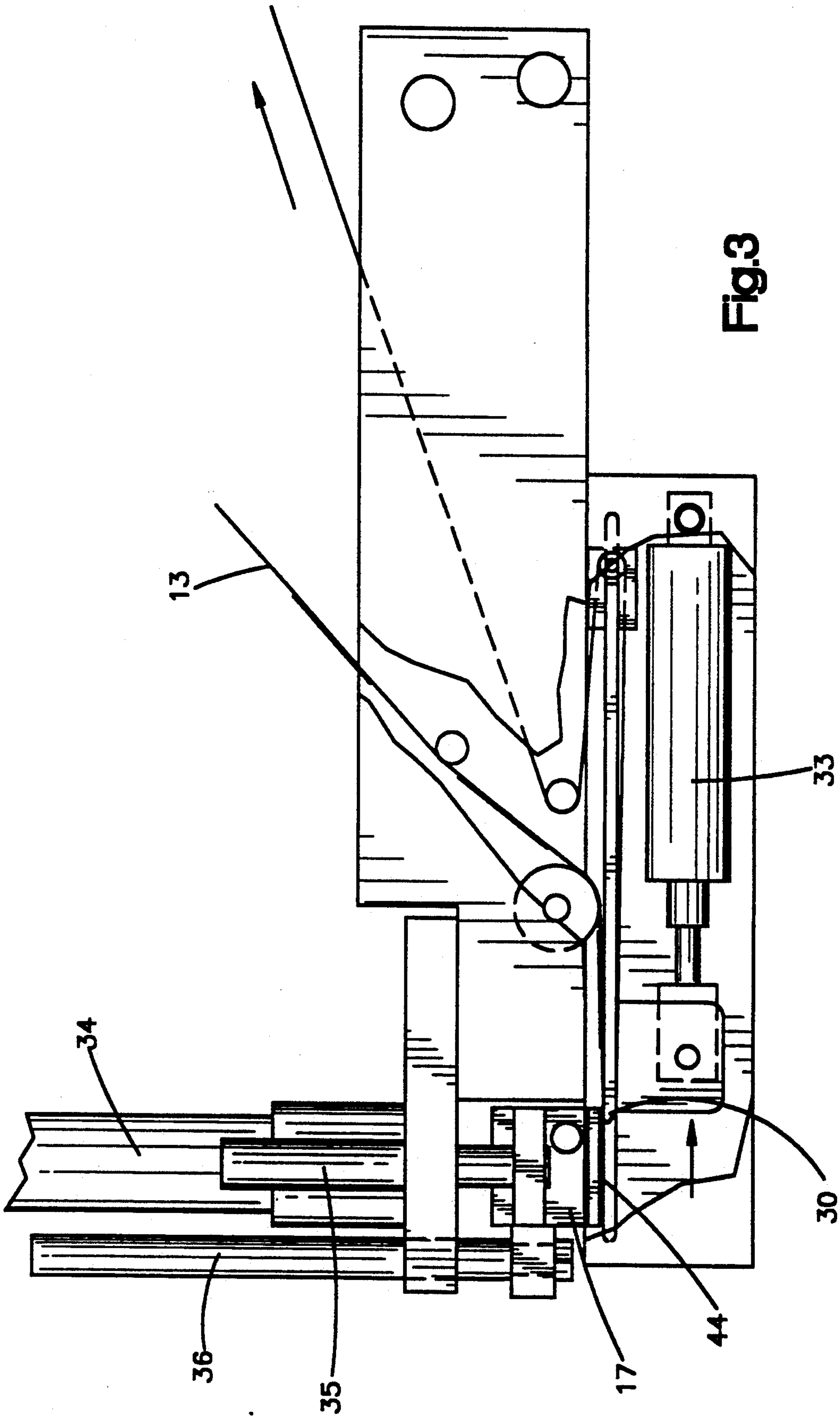
FIG. 3 is a fragmentary side elevational view on the scale of FIG. 2 illustrating the vacuum head in its pick-up position and the item support returning to its retracted position.
Figure 4:
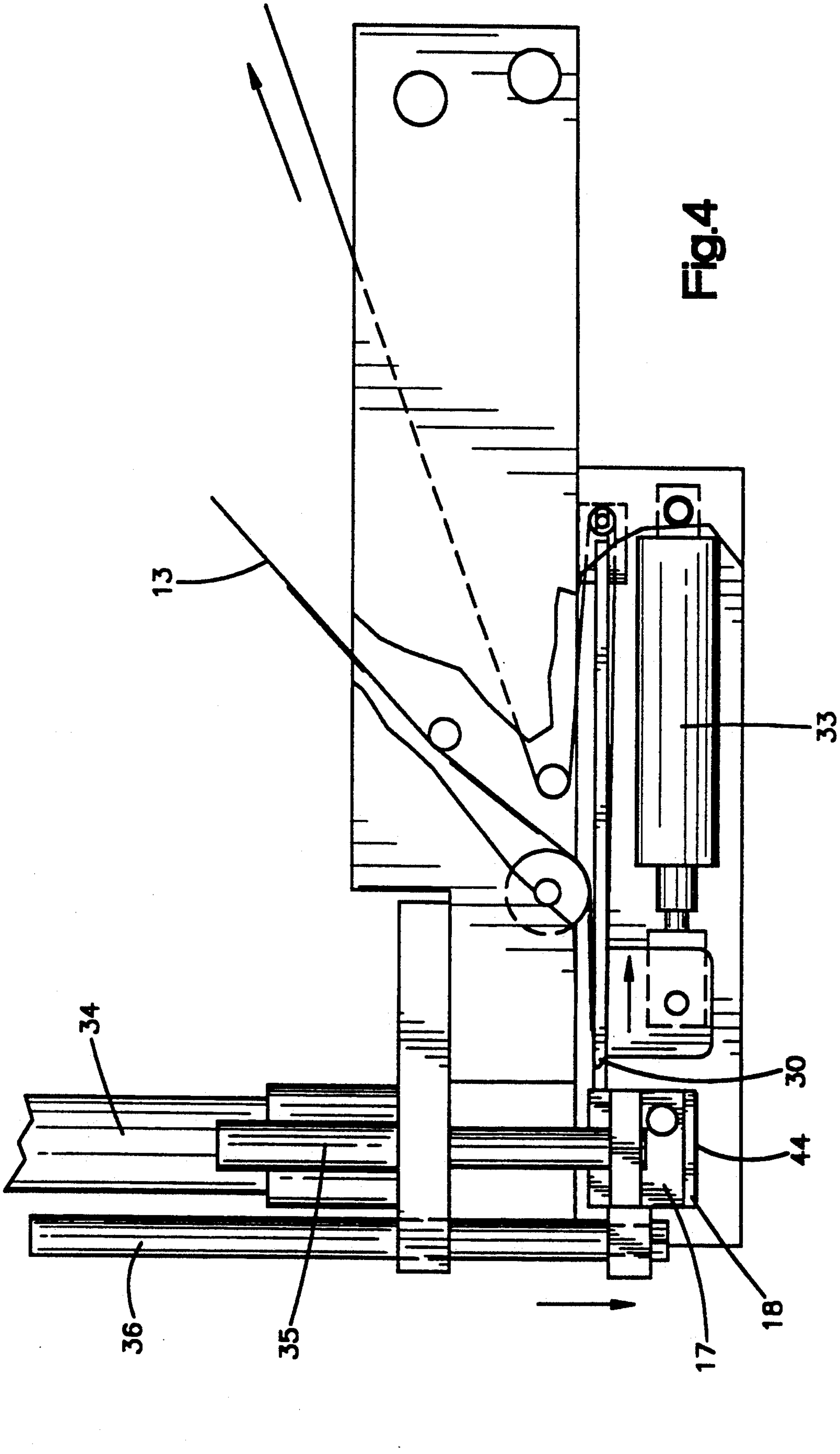
FIG. 4 is a fragmentary side elevational view on the scale of FIG. 2 illustrating the vacuum head moving to its application position and the item support returning to its retracted position.
Figure 5:
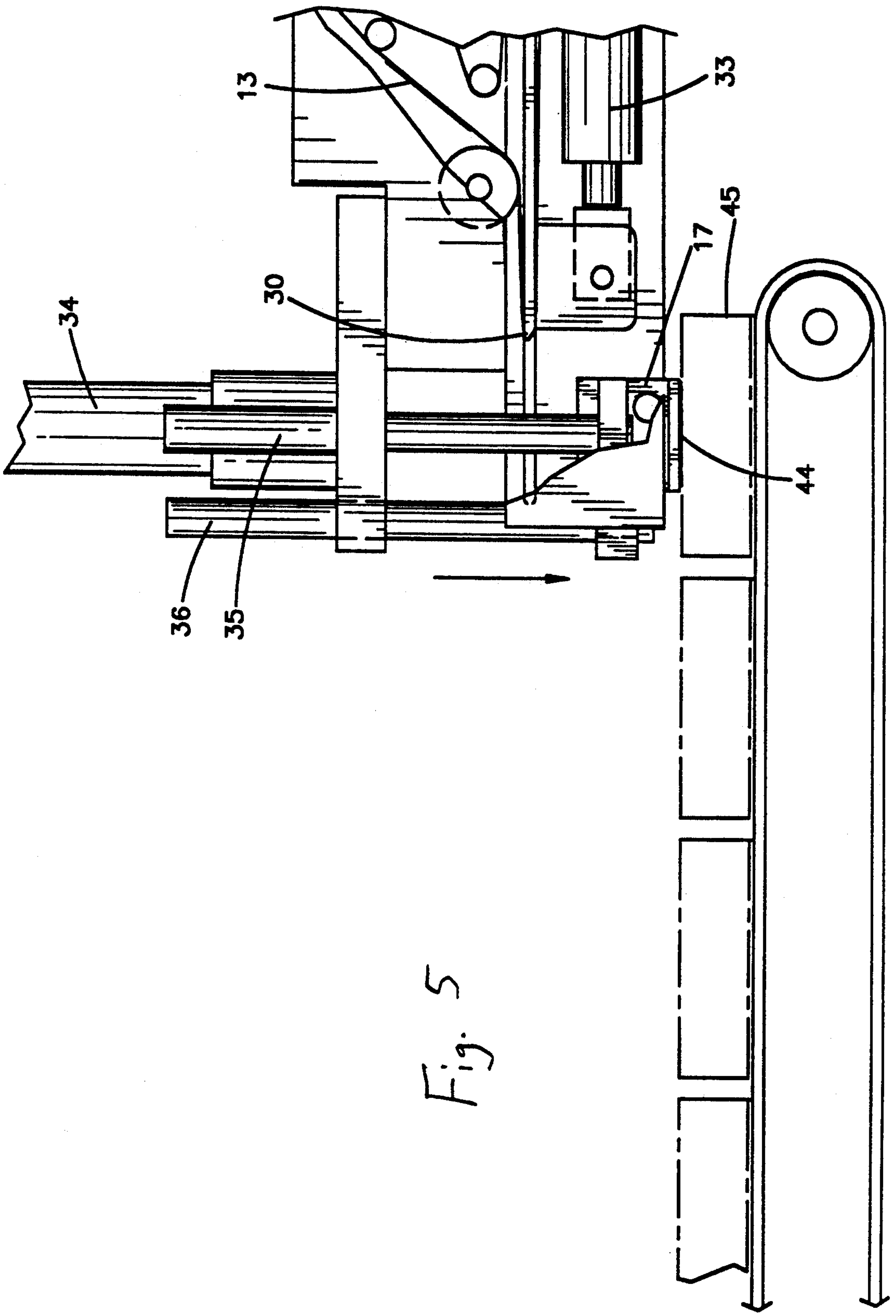
FIG. 5 is an enlarged fragmentary side elevational view illustrating the vacuum head in its application position and the item support in its retracted position with a conveyor supplying products.
Figure 6:
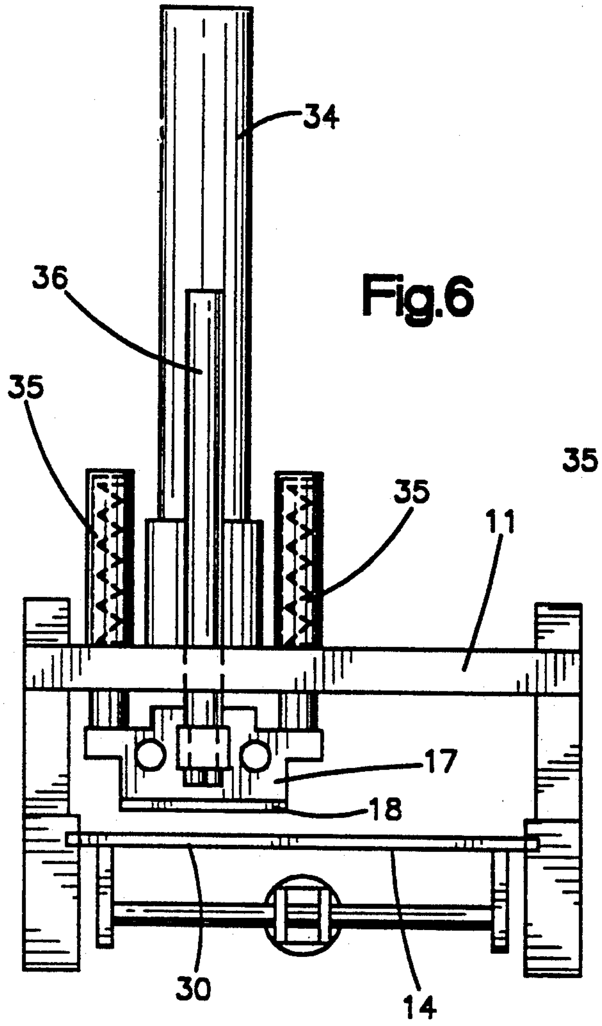
FIG. 6 is an end elevational view of the vacuum head and item support.

The applicator arm 16 is capable of moving among three positions: a retracted position (shown in FIGS. 1 and 6), a pick-up position (shown in FIGS. 2, 3 and 7) and an application position (shown in FIG. 5). The applicator arm 16 is reciprocated along its path preferably by an air cylinder 34. The arm 16 is moved to its retracted position as shown in FIG. 1 when the cylinder is powered up. The arm 16 is stopped in this position by resilient, spring type devices, preferably in the form of hydraulic shock absorbers 35 (shown as springs). In the test unit which has been constructed, the hydraulic shock absorbers are Enidine Pro-15 hydraulic shock absorbers which can be purchased from Enidine, Inc., 7 Centre Dr., Orchard Park, N.Y. 14127. The arm 16 is biased towards its pick-up position by the shock absorbers 35. The arm 16 is therefore moved to its pick-up position as shown in FIGS. 2 and 3 by resilient action of the shock absorbers 35 when the cylinder 34 is powered off. The arm 16 is then moved to its application position as shown in FIGS. 4 and 5 by the cylinder 34 when the cylinder 34 is powered down. Guide 36 is reciprocatably journaled in a support 37 and guides the applicator arm 16 along its path ensuring its accurate movement.

Turning to FIGS. 2–5, the operation of the machine 10 will be explained. A stepper motor (shown schematically in FIG. 1) rotates the supply and take-up reels 12 and 15 as well as the pinch rollers 24, 25 as the actuator 33 moves the item support 14 to its dispensing position under the vacuum head 17. This activity advances the supply strip 13. As the item support 14 moves toward its dispensing position, the applicator arm 16 moves to its pick-up position.

As is typical in the industry, an item detector 39, generally a micro-switch, detects when an item to be applied is in proper position and advancement of the supply strip should be stopped by detecting an edge of the item. When an item is detected as being in proper position, the stepper motor stops advancing the reels 12, 15. This coordinates advancement of the item support 14 with supplying of the supply strip 13 as well as retraction of the support 14 with take-up of the strip 13. A signal from a machine control (not shown) signals the stepper motor to advance the reel 12, 15 when appropriate.

Figure 7:
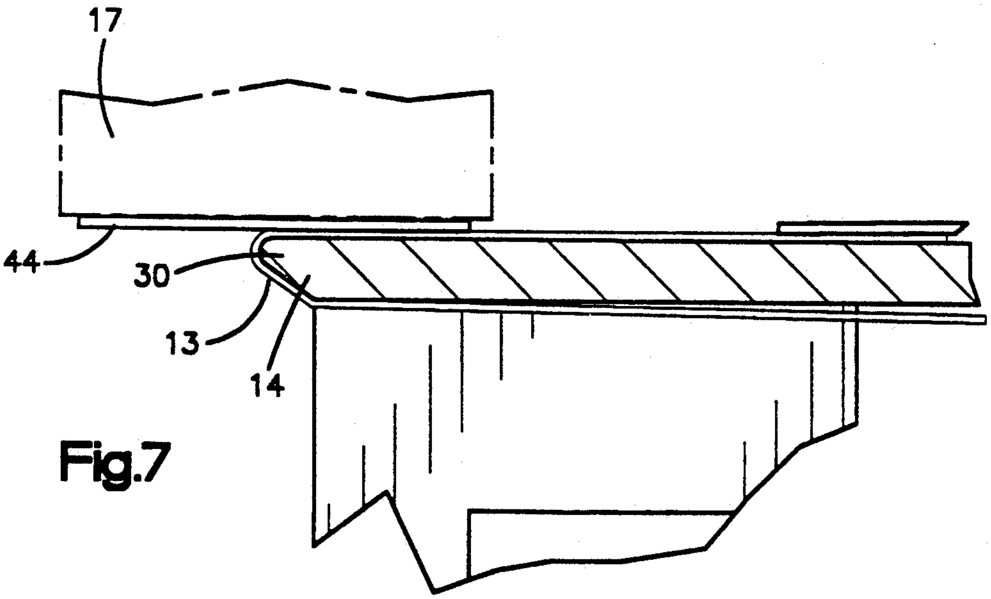

Once the item support 14 reaches its dispensing position, spindles 40 and 41 which carry the reels 12 and 15 are locked by brakes 42 and 43, respectively. The item support 14 then moves back to its retracted position. As the item support 14 moves to its retracted position, the supply strip 13 moves around the dispensing end portion 30 and the trailing end portion 31. This movement of the supply strip 13 causes an item 44 to be dispensed at the dispensing end portion 30 as best seen in FIGS. 3 and 7.

A vacuum control (shown schematically in FIG. 2) turns the vacuum source (also schematically in FIG. 2) on when the vacuum head 17 is to engage an item. The vacuum source of the test unit is a Piab Venturi Vacuum Generator which can be purchased from Piab Vacuum Products, 65 Sharp St., Hingham, Mass. 02043. The vacuum source communicates with the vacuum head via vacuum line 46. The dispensed item 44 is engaged by the vacuum head 17 prior to the item support 14 beginning to return to its retracted position. This engagement occurs when the applicator arm 16 and the item support 14 meet in their pick-up position and dispensing position respectively. This allows the vacuum head to support the item the entire time it is being dispensed right up to being placed on an object 45 and allows the item 44 to be applied to the object 45 as precisely as it was applied to the supply strip 13.

Once the item support 14 reaches its retracted position and the item 44 is completely dispensed from the strip 13, the applicator arm 16 is moved to its applicatication position and applies the item 44 to the object 45 as shown in FIGS. 4 and 5. The vacuum control turns off the vacuum source so that the item 44 may be applied to the object 45.

Figure 6A:
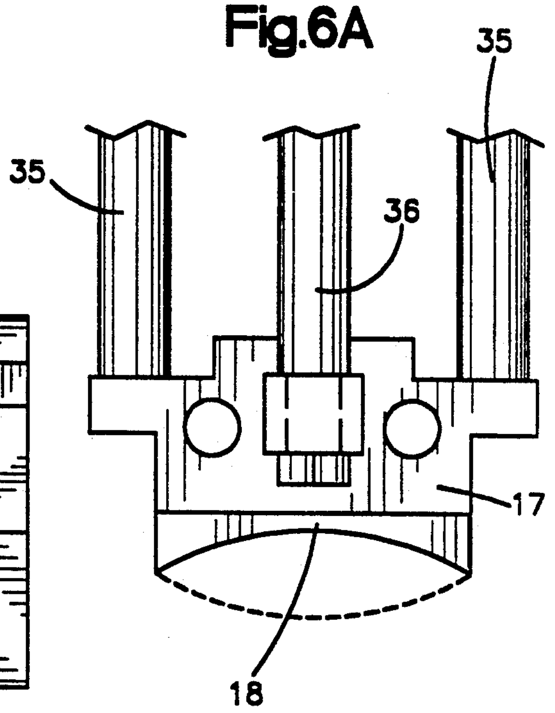
FIG. 6A is an enlarged elevational view of an alternate embodiment of the vacuum head; and, FIG. 7 is an enlarged fragmentary elevational view of the dispensing edge of the item support dispensing an item from the supply strip.

An alternative embodiment is illustrated in FIG. 6A wherein the face 18 of the vacuum head 17 is curved. This allows the machine 10 to apply items to objects having curved surfaces. The face 18 illustrated in FIG. 6A is concave to apply items to round products having convex surfaces such as balls and fruit. The face 18 could also be convex (as shown in phantom) in order to apply items to concave objects such as saucers and ashtrays.

While the preferred embodiments of the invention have been illustrated and described in detail, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

I claim:

1. An applicator appartus for applying to products items such as tags and labels carried by an elongate flexible supply strip, the applicator comprising:

a) an item support having a dispensing end portion and a trailing end portion, such supply strip when in use being supported by the item support and wrapped around the two end portions of the support;

b) motion producing means operatively connected to the support for moving the support and causing relative motion of such strip at the trailing end portion thereby causing the items to individually peel off of such strip at the dispensing end portion;

c) a moveable vacuum head for taking an item prior to and as such item is peeled off of such strip and applying such item to a product, the head being adapted to travel a path including at least a retracted position and a pick-up position; and, d) drive means for relatively moving a workpiece and the head to transfer a taken item from the head to such workpiece.

2. The apparatus of claim 1 wherein such strip is fed from a supply station to a collection station for winding and collecting such strip after it has dispensed an item and wherein the motion producing means causes support retraction during a portion of an apparatus cycle, and the apparatus further comprises a locking means to lock the strip during the retraction portion as the support is moved away from the path of the head.

3. The apparatus of claim 1 wherein said item support is actuated by an air cylinder.

4. An applicator apparatus for applying to products items such as tags and labels carried by an elongate flexible supply strip, the applicator comprising:

a) a reciprocating item support having a dispensing end portion and a trailing end portion, such supply strip when in use being supported by the item support and wrapped around the two end portions of the support;

b) reciprocating means operatively connected to the support for reciprocating the support against such strip at the trailing end portion thereby causing the items to individually peel off of such strip at the dispensing end portion;

c) a reciprocatable vacuum head for taking an item as such item is peeled off of such strip and applying such item to a product, the head being adapted to travel a path including at least a retracted position and a pick-up position; and, d) drive means for relatively moving a workpiece and the head to transfer a taken item from the head to such workpiece.

5. The apparatus of claim 4 wherein such supply strip is carried on a first rotatable reel and is attached to a second rotatable reel for winding such strip after it has dispensed an item and the apparatus further comprises a locking means to lock the reels during retraction of the support away from the path of the head.

6. The apparatus of claim 4 wherein the head, when in the pick-up position, engages an item prior to the item being peeled from such strip.

7. The apparatus of claim 4 wherein the drive means moves the head from the pick-up position to an application position for transfer of an item to such workpiece.

8. The apparatus of claim 4 wherein said reciprocating item support is actuated by an air cylinder.

9. The apparatus of claim 4 wherein said vacuum head has a curved pick-up surface thereby allowing it to apply items to curved products such as fruit.

10. The apparatus of claim 4 wherein the pick-up surface is curved in cross-section to a configuration approximating the configuration of a curved workpiece surface to which an item is to be applied.

11. The method of applying items carried by supply strips such as tags or labels to products, comprising:

a) moving the strip to register an item in a pick-up position, thereafter grasping the registered item with a vacuum head by moving the head from a retracted position to a pick-up position while the registered item is still mounted on the supply strip;

b) dispensing the registered item from the item supply strip while so grasped by moving an item support between two portions of the item supply strip while restraining feed of the strip from a supply, the movement causing the registered item being dispensed to peel off of the supply strip at a dispensing end portion of the item support; and, c) applying the dispensed item to a product with the vacuum head.

12. An applicator for applying items each having a surface bearing a pressure-sensitive adhesive comprising:

a) a supply structure defining a supply station and including a supply support for a spool carrying a coil of item bearing strip;

b) a take-up structure defining a take-up station and including a take-up for carrying a take-up spool to coil the strip after such items have been removed therefrom;

c) a reciprocatable support including top and bottom surfaces delineating a section of a strip path of travel from the supply to a take-up station;

d) path-delineating structure operably connected to the supply and take-up structures and cooperating with the support to define the path of travel wherein the strip is fed along a portion of the top surface, over a support beak, along the bottom surface, around an end portion of the support remote from the dispensing end portion and thence along another portion of the top surface;

e) a moveable label-positioning head having head retracted, label pick-up and label-applying positions;

f) a support drive means for advancing the support from a support retracted position to an item dispensing position when the head is in its head retracted position and for retracting the support from its transfer position to the support retracted position when the head is in its label pick-up position whereby to remove a positioned item from the strip and transfer it to the head.

13. The applicator of claim 12 wherein the head engages an item to be picked-up when in the pick-up position and prior to retraction of the support from its item transfer position.

14. The applicator of claim 12 wherein a spool rotation means is operably connected to the supply and take-up structures for supplying and taking up strip in coordination with advancement of the support and for retarding strip supply and take-up as the support is retracted.

15. The applicator of claim 12 wherein the head is connected to a vacuum source which is operated when the head is in its pick-up position and as the head moves from its pick-up position to its applying position.

16. The applicator of claim 12 wherein a prime mover is operably connected to the head to shift the head between the head retracted and applying positions.

17. The applicator of claim 12 wherein a biasing means is operably connected to the head for shifting the head from its retracted to its pick-up position.

18. In a machine having a mechanism for delivering workpieces to a workstation sequentially and one at a time, for applying pressure-sensitive items such as labels or hangers to such workpieces sequentially one at a time, an improved item applicator assembly comprising:

a) housing and frame structure delineating supply and take-up stations, the supply and take-up stations respectively having supply and take-up spool supports for respectively supporting supply and take-up spools;

b) the housing and frame structure including components delineating a path of strip travel from a supply spool on the supply spool support to a take-up spool on the take-up spool support;

c) a reciprocatable strip support having an end portion which is projectable into and retractable from a dispensing position in a labeling station, the strip support including a beak forming a part of the end portion, and opposed supply and exit surfaces extending from the beak in a direction away from the labeling station, the exit surface extending from the beak to and around an opposed end portion of the strip support, the supply and exit surfaces and the beak delineating a section of such strip path of travel;

d) a pick-up head including a perforate item-engaging surface and a communicating vacuum passage;

e) a vacuum source coupled to the vacuum passage;

f) a prime mover connected to the head to shift the head between retracted and label-applying positions, the head also having a pick-up position intermediate the retracted and label-applying positions;

g) vacuum control means operably connected to the vacuum supply and vacuum passage for applying vacuum to the perforate portion at least from when the head is in its item pick-up position until the head has moved to its label applicating position; and h) strip feed control means operably connected to the supply and take-up stations to cause the feed of strip in coordination with the reciprocation of the strip support to its label-delivery position and to retard the feed of strip as the label supply structure is retracted from its delivery position.

19. The item applicator assembly of claim 18 wherein a prime mover is operably connected to the head to shift the head between the head retracted and applying positions.

20. The applicator of claim 18 wherein a strip support drive is connected to the strip support and adapted to shift the support from its label delivery position after the head has been moved to its pick-up position and engaged an item to be separated from a strip.

21. A process of applying items having at least one pressure-sensitive adhesive-coated surface to workpieces comprising:

a) feeding an elongated strip carrying an adhered to, longitudinally disposed set of items along a path of travel from a strip supply to position an item at a pick-up station;

b) engaging the item positioned at the station with a pick-up head by moving the head from a retracted position to a pick-up position, c) interrupting and preventing the strip feed and while the strip feed is so interrupted, shifting a strip support away from the station while drawing a section of the strip around a support beak to separate the engaged item from the strip;

d) bringing the separated item into engagement with a workpiece; and, e) thereafter releasing the separated item from the head.

22. An applicator for applying items each having a surface bearing a pressure-sensitive adhesive comprising:

a) a supply structure defining a supply station and including a support for structure to carry a supply of item bearing strip;

b) a take-up structure defining a take-up station and including structure to carry the strip after such items have been removed therefrom;
c) a reciprocatable support including top and bottom surfaces delineating a section of a strip path of travel from the supply to a take-up station;
d) path-delineating structure operably connected to the supply and take-up structures and cooperating with the support to define the path of travel wherein the strip is fed along a portion of the top surface, over a support beak, along the bottom surface, around an end portion of the support remote from the dispensing end portion and thence along another portion of the top surface;
e) a moveable label-positioning head having head retracted, label pick-up and label-applying positions;
f) a support drive means for advancing the support from a support retracted position to an item dispensing position when the head is in its head retracted position and for retracting the support from its transfer position to the support retracted position when the head is in its label pick-up position whereby to remove a positioned item from the strip and transfer it to the head.

23. The applicator of claim 22 wherein the head engages an item to be picked-up when in the pick-up position and prior to retraction of the support from its item transfer position.

24. The applicator of claim 22 wherein the head is connected to a vacuum source which is operated when the head is in its pick-up position and as the head moves from its pick-up position to its applying position.

25. The applicator of claim 22 wherein a strip supply means is operably connected to the supply and take-up structures for supplying and taking up strip in coordination with advancement of the support and for retarding strip supply and take-up as the support is retracted.

26. The applicator of claim 22 wherein a prime mover is operably connected to the head to shift the head between the head retracted and applying positions.

27. The applicator of claim 22 wherein a biasing means is operably connected to the head for shifting the head from its retracted to its pick-up position.

28. In a machine having a mechanism for delivering workpieces to a workstation sequentially and one at a time, for applying pressure-sensitive items such as labels or hangers to such workpieces sequentially one at a time, an improved item applicator assembly comprising:
a) housing and frame structure delineating supply and take-up stations;
b) the housing and frame structure including components delineating a path of strip travel from a supply device at the supply station to a take-up device at the take-up station;
c) a reciprocatable strip support having an end portion which is projectable into and retractable from a dispensing position in a labeling station, the strip support including a beak forming a part of the end portion, and opposed supply and exit surfaces extending from the beak in a direction away from the labeling station, the exit surface extending from the beak to and around an opposed end portion of the strip support, the supply and exit surfaces and the beak delineating a section of such strip path of travel;
d) a pick-up head including a perforate item-engaging surface and a communicating vacuum passage;
e) a vacuum source coupled to the vacuum passage;
f) a prime mover connected to the head to shift the head between retracted and label-applying positions, the head also having a pick-up position intermediate the retracted and label-applying positions;
g) vacuum control means operably connected to the vacuum supply and vacuum passage for applying vacuum to the perforate portion at least from when the head is in its item pick-up position until the head has moved to its label applicating position; and
h) strip feed control means operably connected to the supply and take-up stations to cause the feed of strip in coordination with the reciprocation of the strip support to its label-delivery position and to retard the feed of strip as the label supply structure is retracted from its delivery position.

29. The item applicator assembly of claim 28 wherein a prime mover is operably connected to the head to shift the head between the head retracted and applying positions.

30. The applicator of claim 28 wherein a strip support drive is connected to the strip support and adapted to shift the support from its label delivery position after the head has been moved to its pick-up position and engaged an item to be separated from a strip.

31. The applicator of claim 12 wherein the head has a reciprocal path of travel among its head retracted pick-up and label-applying positions and wherein said head path is orthogonal to a path of support reciprocation.

32. The applicator of claim 18 wherein the head has a reciprocal path of travel among its head retracted, pick-up and label-applying positions and wherein said head path is orthogonal to a path of support reciprocation.

33. The applicator of claim 22 wherein the head has a reciprocal path of travel among its head retracted, pick-up and label-applying positions and wherein said head path is orthogonal to a path of support reciprocation.

34. The machine of claim 28 wherein the prime mover shifts the head along a reciprocal path of travel orthogonal to a path of support reciprocation.

35. A process of dispensing items releasably adhered to a web from the web comprising;
a) feeding the web along a web path from a supply around a first end of a reciprocatable support along a selected one of a top and a bottom surface of the support and thence around a second support end to a takeup;
b) advancing the web to position an item in registration at a pick-up position;
c) locking the feed of the web along the web path to prevent dispensing from the supply and feed to the take up;
d) engaging a pick-up head with the positioned item by shifting the head from a retracted position along a head path of travel to a pick-up position;
e) while the feed is so locked and the positioned item is engaged moving the support out of the head path of travel to cause the strip to feed around one of the ends which functions as a beak, thence along the selected surface and around the other of the ends thereby striping the positioned and engaged item from the web;
f) moving the head further along the head path of travel to an application position; and
g) applying the positioned, engaged and stripped item to an object.

* * * * *